8405X
D. Cleaveland,
Horse-Collar Block,
Patented Sep. 13, 1834.
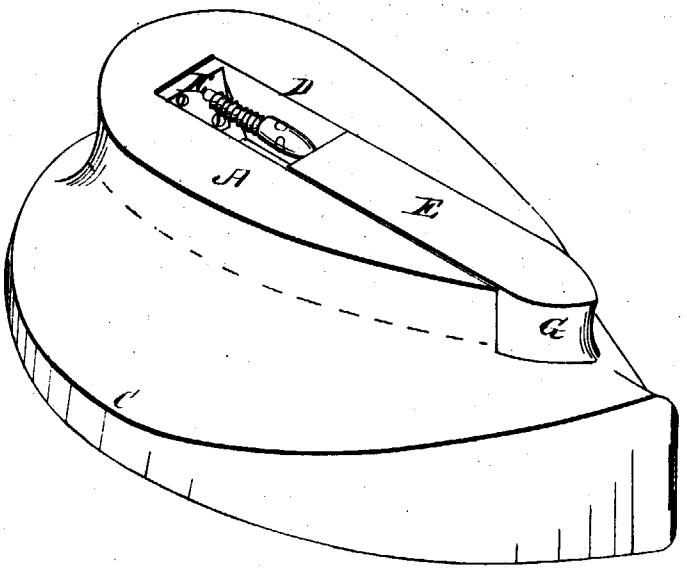
N. PETERS, PHOTO-LITHOGRAPHER, WASHINGTON, D. C.

Dyer Cleaveland

Letters Patent

The schedule referred to in these letters patent and making part of the same containing a description in the words of the said Dyer Cleaveland himself of his improvement in the machine, called a Horse collar block

---

To all to whom these present shall come

Be it known, that I Dyer Cleaveland of Owego in the County of Tioga and State of New York have invented a new and useful improvement in the machine called a horse collar block, for the purpose of forming or fashioning horse or hame collars on, and that the following is a full and exact description of the construction and operation of the said Machine as invented or improved by me.

The said machine or collar block may be made of cast iron or wood twenty inches long more or less, in the widest place it is sixteen inches more or less, and eight inches thick more or less, the upper part or about one fourth of the thickness of the block is formed to the shape of that part of a collar that is commonly called the roll or rim of the Collar; and in the widest place is eight inches more or less the remaining three fourths of the thickness of the block is made to extend four inches, more or less, all round the upper part that forms the roll or rim of the collar, and is cut or hollowed out in a proper manner to shape or form that part of the Collar that is called the pad or belly of the collar. In the upper part or surface of the block, there is a channel or groove, cut out three inches wide, and three inches deep, more or less, running length-wise of the block to within about three inches of the round end of the block, where there is a screw and nut fixed: then there is a piece of wood, three inches square and twelve inches long, more or less, fitted in the said channel or groove in such a manner that it will slide back and forth in said channel or groove, by the operation of [illegible] screw that is fixed at the round end of said block, the screw work against the end of the sliding piece of wood that operates in the said channel or groove, the end of the sliding piece of wood opposite to the screw is formed to fit on the small end or top of a collar, and when a collar is put on the block and the screw turned, it drives the sliding piece against the upper or small end of the collar, and draws it tight to the block and gives it the desired shape and form so that it will fit the neck and breast of a horse, at the same time it stretches the collar and takes out all the wrinkles that may be in the leather and leaves it smooth & even.

In using said Machine in the first place, after the collar is stuffed the two ends are brought together, and confined by means of a rope passing round the collar, between the roll and pad lengthwise. Then the collar is put on the block and by turning the screw is drawn tight to the block, and brings it into shape as far as it can be before it is sewed together. then the collar is taken from the block and sewed together, and again is put on the block and brought into proper form by the operation of the screw against the sliding part of said Machine.

Witness
T. Armstrong
W. W. Hunt

Dyer Cleaveland (Patented 13 Sept. 1834)

[illegible] (Drawing.)

Exd [illegible]